United States Patent
Mamer et al.

(10) Patent No.: US 11,817,616 B2
(45) Date of Patent: Nov. 14, 2023

(54) ANTENNA MAST STRUCTURE

(71) Applicant: Caterpillar Global Mining Equipment LLC, Denison, TX (US)

(72) Inventors: Justin R Mamer, Brawley, CA (US); Quintin W McDaniel, Marana, AZ (US); Baba Sharat Chandra Lingozi, Oro Valley, AZ (US); Michael J Vance, Sahuarita, AZ (US)

(73) Assignee: Caterpillar Global Mining Equipment LLC, Denison, TX (US)

( * ) Notice: Subject to any disclaimer, the term of this patent is extended or adjusted under 35 U.S.C. 154(b) by 401 days.

(21) Appl. No.: 17/227,893

(22) Filed: Apr. 12, 2021

(65) Prior Publication Data
US 2022/0328950 A1   Oct. 13, 2022

(51) Int. Cl.
*H01Q 1/20* (2006.01)
*H01Q 1/32* (2006.01)
*B60R 11/02* (2006.01)
*B60R 11/00* (2006.01)

(52) U.S. Cl.
CPC ............... *H01Q 1/20* (2013.01); *B60R 11/02* (2013.01); *H01Q 1/3208* (2013.01); *H01Q 1/3275* (2013.01); *B60R 2011/004* (2013.01); *B60R 2011/0064* (2013.01)

(58) Field of Classification Search
CPC ...... H01Q 1/20; H01Q 1/3208; H01Q 1/3275; B60R 11/02; B60R 2011/004; B60R 2011/0064
USPC .......................................................... 52/110
See application file for complete search history.

(56) References Cited

U.S. PATENT DOCUMENTS

| | | | |
|---|---|---|---|
| 3,393,480 A | 7/1968 | Groseclose | |
| 4,290,495 A * | 9/1981 | Elliston | E21B 19/084 173/147 |
| 5,410,325 A | 4/1995 | Friedrich et al. | |
| 8,955,264 B2 * | 2/2015 | Edwards | E04H 12/182 52/118 |
| 10,312,577 B2 | 6/2019 | Yui et al. | |
| 2008/0035042 A1* | 2/2008 | Smith | B63B 15/0083 114/91 |
| 2008/0180349 A1* | 7/2008 | Newman | E04H 12/182 343/890 |
| 2012/0132781 A1 | 5/2012 | Kolokotronis | |
| 2014/0062806 A1* | 3/2014 | Higby | H01Q 1/1235 439/13 |
| 2015/0244057 A1 | 8/2015 | Hebrard De Veyrinas | |

(Continued)

FOREIGN PATENT DOCUMENTS

| | | |
|---|---|---|
| JP | 2018093790 A | 6/2018 |
| JP | 6586509 B2 | 10/2019 |
| KR | 20140047706 A | 4/2014 |

OTHER PUBLICATIONS

Written Opinion and International Search Report for Int'l. Patent Appln. No. PCT/US2022/022086, dated Jul. 22, 2022 (8 pgs).

*Primary Examiner* — Mark R Wendell (57) ABSTRACT

An antenna mast structure for a haul truck may include a buttressed frame having a support column and a raised frontal support point. The antenna mast structure may also include a propping element extending from the raised frontal support point and a top frame pivotally secured to the support column and supported at a front side by the propping element.

25 Claims, 11 Drawing Sheets

(56) References Cited

U.S. PATENT DOCUMENTS

2016/0261019 A1\* 9/2016 Garmong .............. E04H 12/187
2020/0251809 A1 8/2020 Hanada \* cited by examiner

ANTENNA MAST STRUCTURE

TECHNICAL FIELD

The present application relates generally to vibration resistant structures. More particularly, the present application relates to support structures positioned on, and subject to vibration from, moving vehicles. Still more particularly, the present application relates to antenna mast structures for supporting communication or other antennas on construction equipment or other work machines.

BACKGROUND

Work machines and other vehicles include antennas or other communication devices for wirelessly transmitting and/or receiving signals. In days of old, antennas may have been used for radio signals, citizen's band (CB) radio signals, or other signals. Today, antennas may continue to be provided for these purposes. However, in addition, antennas for accessing global navigational satellite systems (GNSS), such as global positioning systems (GPS), may be present on vehicles or work machines for helping to identify positional information of vehicles or work machines. For example, and particularly in the context of autonomous work machines, positional information may be used by remote operators or operator systems to manipulate autonomous work machines on a job site, a project, a mining operation, or for other purposes.

In the context of haul trucks, such as quarry trucks, mining trucks, or other heavy equipment type trucks, finding or providing mounting locations for antennas may be a difficult problem. That is, for example, haul trucks may include a very large truck bed that may include a protective platform extending forward from the truck bed and above the cab of the truck to protect the cab from falling rock or other damaging debris. GNSS antennas, in particular, may perform better when they have a 360 degree field of view. Given the nature of haul trucks, finding a mounting location that allows the antennas to extend above the top of the rest of the parts of the truck to provide a 360 degree field of view may often involve a support structure that extends from a service or access platform around the cab. Given that the access platform is arranged below the protective platform, one approach to providing antenna support may include providing one or more cantilevered members that extend out beyond the front edge of the protective platform. However, fatigue loading on cantilevered members due to truck motion and vibration may lead to premature failure of the cantilevered members.

U.S. Pat. No. 10,312,577 to Komatsu includes an antenna unit 20 in the form of an antenna attachment structure. The attachment structure includes an antenna attachment portion 21 and a parallel link mechanism 22 as shown in FIG. 4A. The antenna attachment portion 21 is attached to each of the side plates 13 of the dump body 3 such that the antenna attachment portion 21 is rotatable around a rotation center O on each of the side plates 13. The antenna attachment portion 21 includes an attachment body 23 and an extension 24.

SUMMARY

In one or more embodiments, an antenna mast structure for a haul truck may include a buttressed frame having a support column and a raised frontal support point. The antenna mast structure may also include a propping element extending from the raised frontal support point. The antenna mast structure may also include a top frame pivotally secured to the support column and supported at a front side by the propping element.

In one or more embodiments, a haul truck may include a frame, a traction system for moving the frame, an access platform, and a truck bed having a protective platform extending over the access platform to a front edge. The haul truck may also include an antenna mast structure arranged on the access platform. The antenna mast structure may include a buttressed frame having a support column and a raised frontal support point. The antenna mast structure may also include a propping element extending from the raised frontal support point and a top frame pivotally secured to the support column. The top frame may be supported at a front side by the propping element such that a front of the frame is arranged just below and forward of the front edge of the protective platform.

DETAILED DESCRIPTION

Figure 1:
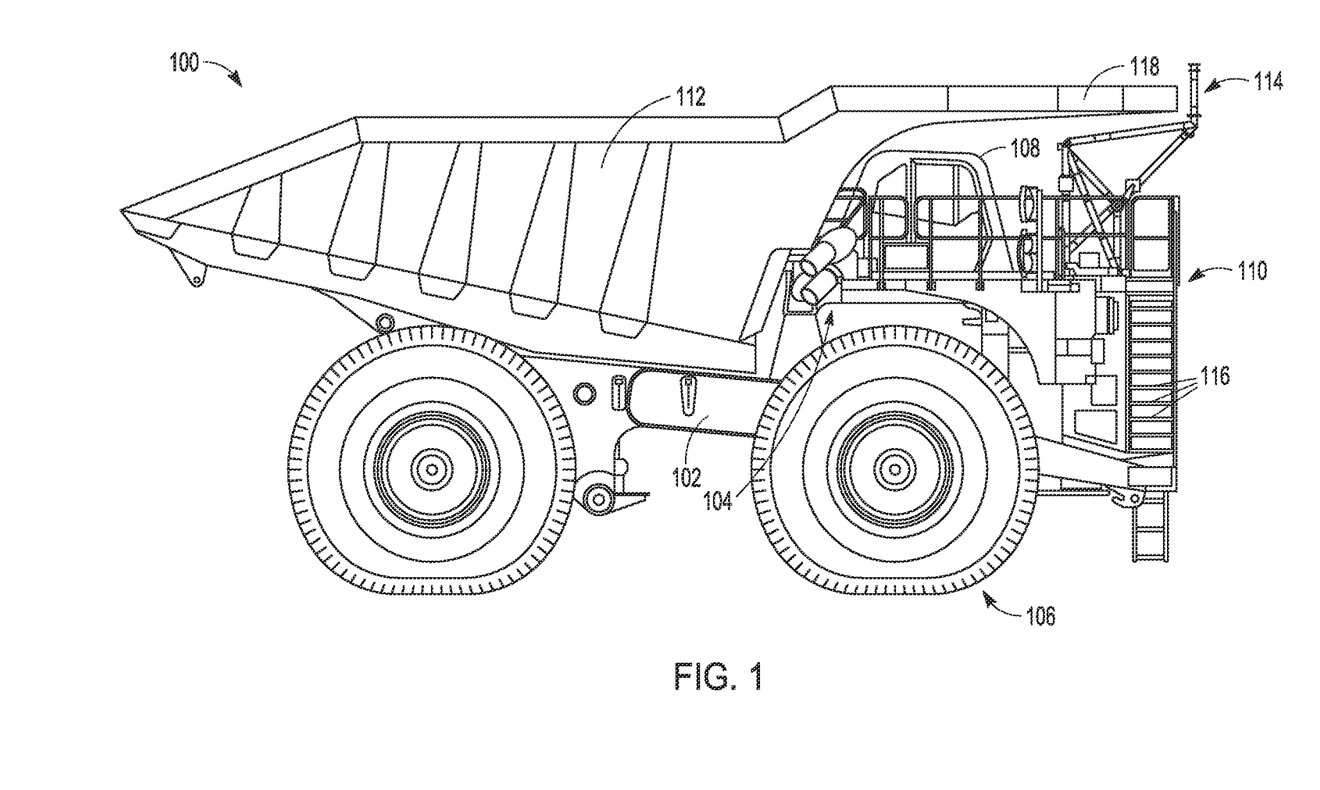
FIG. 1 is a perspective view of a haul truck with an antenna mast structure, according to one or more embodiments.

FIG. 1 is a perspective view of a haul truck 100. The haul truck may be configured for hauling heavy rock, debris, equipment, or other items. In one or more embodiments, for example, the haul truck may be adapted for working in a rock quarry, for example, where rock mining and digging is performed and the mined material is in need of transport to crushers, other processing equipment, or to trucks more suitable for over-the-road transport. As shown, the haul truck 100 may include a frame 102, an engine 104 positioned on the frame, a traction system 106, a cab 108, an access platform 110, a truck bed 112, and an antenna mast structure 114.

The haul truck frame 102 may be configured to support the loads imparted on the truck and transfer the loads the traction components. The frame may, thus, extend between rear and front components of the traction system 106 and provide a support point for the truck bed 112 and a support system for the engine 104. The frame 102 may also extend forward of the front component of the traction system 106 to provide support for the access platform 110, the cab 108, the antenna mast structure 114 and other features of the haul truck 100.

The engine 104 may be adapted to provide power to the haul truck 100. In particular, the engine 104 may be adapted to provide motive power to the traction system 106 to allow the haul truck 100 to be driven from place to place and may provide power to a hydraulic or other actuation system for the truck bed 112, for example. In one or more embodiments, the engine 104 may include an internal, or external, combustion engine. Alternatively or additionally, electric power may be provided via a turbine or battery source and an electric motor may be provided for powering the traction system 106 and/or the hydraulic system. Still other sources of power may be provided.

The traction system 106 may be configured for moving the haul truck 100 relative to a ground surface. The traction system 106 may include a system of wheels, as shown, or a track type system may be provided. Still other traction systems may be provided.

The cab 108 may be configured to provide a location for an operator to operate the haul truck 100 and, as such, may include one or more operational interfaces such as gas, brake, and steering as well as truck bed controls, and other control interfaces. The cab 108 may be located relatively high on the haul truck 100 to allow for visibility by the operator in front of and to the sides of the haul truck. In one or more embodiments, the cab may be arranged above the height of the traction system 106 as shown. It is to be appreciated that while a cab structure 108 is shown, the haul truck 100 may be operable autonomously as well as via an operator present in the cab 108. In one or more embodiments, where on-truck operation by an operator is not provided, the cab 108 may be omitted, for example.

The access platform 110 may be configured to provide an operator with access to the cab 108. For example, as shown, the access platform 110 may include a stairway 116 extending from ground level upward to a height above the traction system 106. The access platform 110 may be arranged on the frame 102 and provide a relatively flat walking and supporting surface above the traction system 106. In one or more embodiments, the access platform 110 may provide a support surface for other equipment such as hydraulic reservoirs, brake fluid tanks, air tanks, and/or other systems and components.

The truck bed 112 may be configured for receiving and holding large quantities of material. As shown, the truck bed 112 may include a large bucket like system arranged generally on the rear of the haul truck 100. The large bucket like system may include a forward sloping bottom, sidewalls, a front wall arranged behind the cab 108, and a protective platform 118 extending forwardly from a top edge of the front wall and above the cab 108. The truck bed 112 may be articulable in a pivoting motion relative to the frame 102 via a hydraulic cylinder or cylinders to allow for selective dumping of the material within the bed 112.

As shown and mentioned, the haul truck 100 may include an antenna mast structure 114. The antenna mast structure 114 may be adapted to provide a support location in front of the protective platform 118 of the truck bed and at a height sufficient to allow the antennas to extend above the height of the truck bed 112. As shown, the antenna mast structure 114 may be supported by and/or secured to the access platform 110 and be arranged generally below the protective platform 118. The antenna mast structure 114 may extend upward and forward from the access platform 110 and may provide an antenna support just in front of the protective platform 118. The antenna mast structure 114 may be arranged at a height generally flush with or near a bottom of the protective platform 118 such that when the antennas are mounted thereon, the antennas extend above the protective platform. As shown, the antenna mast structure 114 may be designed to avoid intruding on the head space of the stairway on the front of the haul truck 100 and, as such, may extend generally upward from the access platform 110 to a top rail height, for example, before extending forward and upward to the support point of the antenna.

Figure 2:
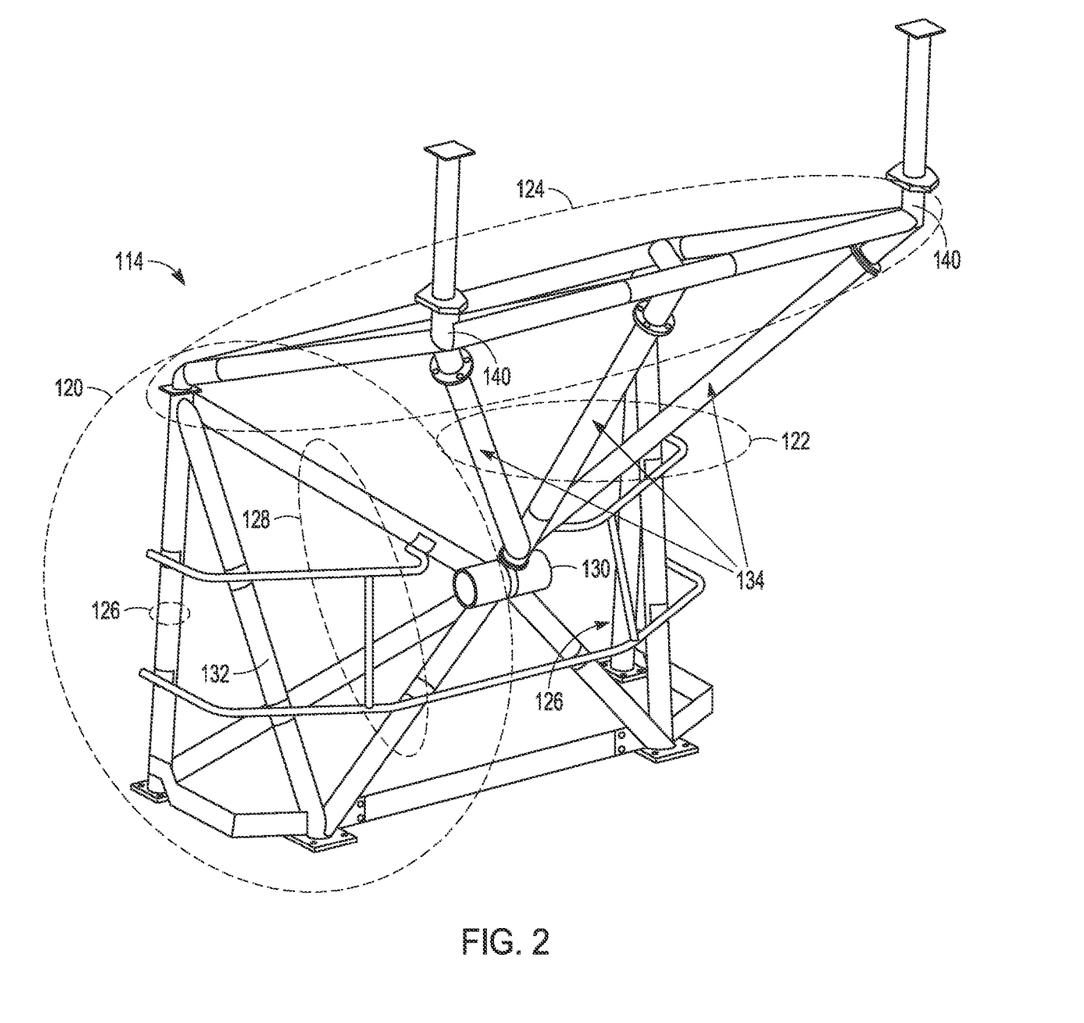
FIG. 2 is a perspective view of the antenna mast structure, according to one or more embodiments.

Turning now to FIGS. 2-5, a more detailed discussion of the antenna mast structure 114 may be provided. As shown in FIG. 2, the antenna mast structure 114 may include one or more buttressed frames 120 providing support points for a top frame 124 and a propping element 122. That is, as shown, the buttressed frames 120 may include a pair of diagonally braced columns 126 on each side of the structure and a pair of lower trusses 128 extending to a raised frontal support point 130. The column 126 and lower trusses 128 may form a frame and the diagonal brace 132 may buttress the frame. The propping element 122 may be in the form of a system or assembly of struts 134 extending upward and forward from the raised and frontal support point. The top frame 124 may be pivotally secured to the tops of the columns 126 and propped by the assembly of struts 134.

Figure 3:
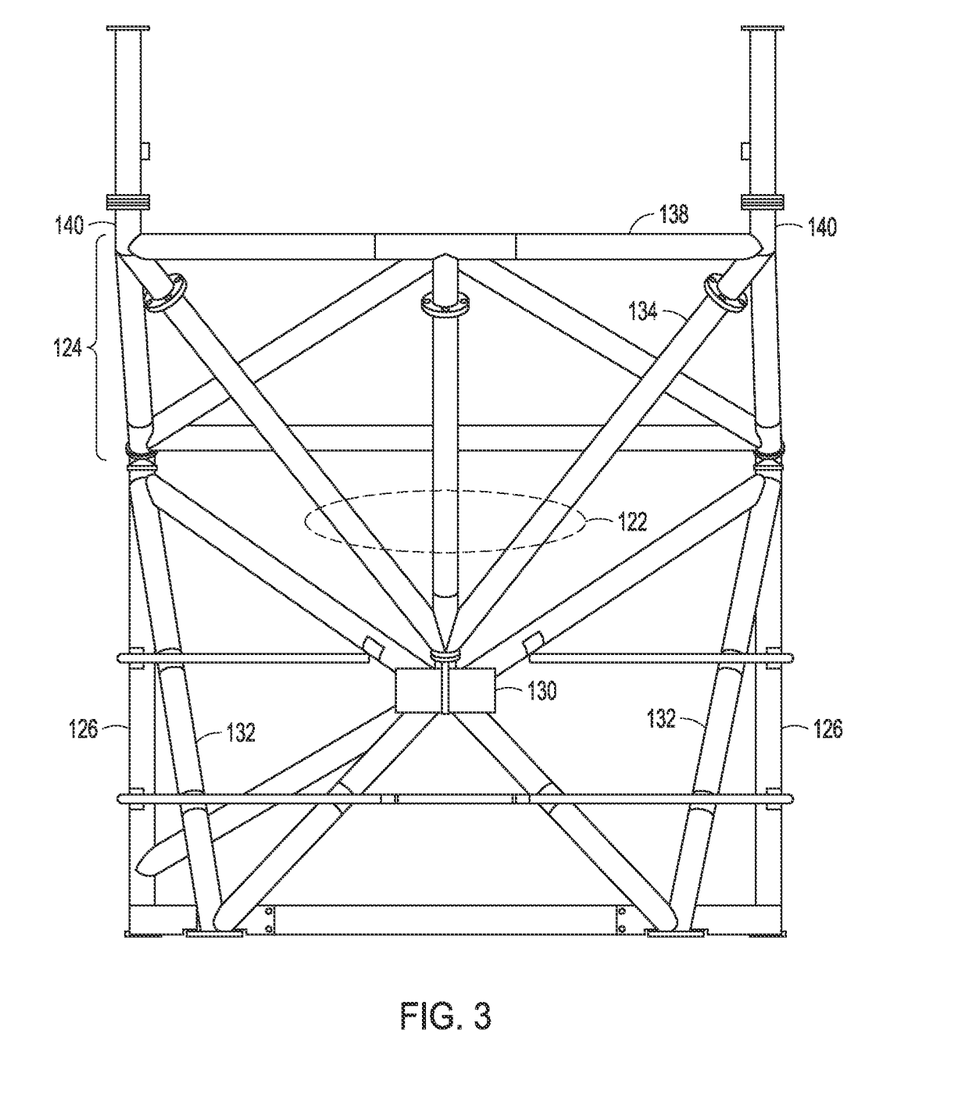
FIG. 3 is a front view thereof.
Figure 4:
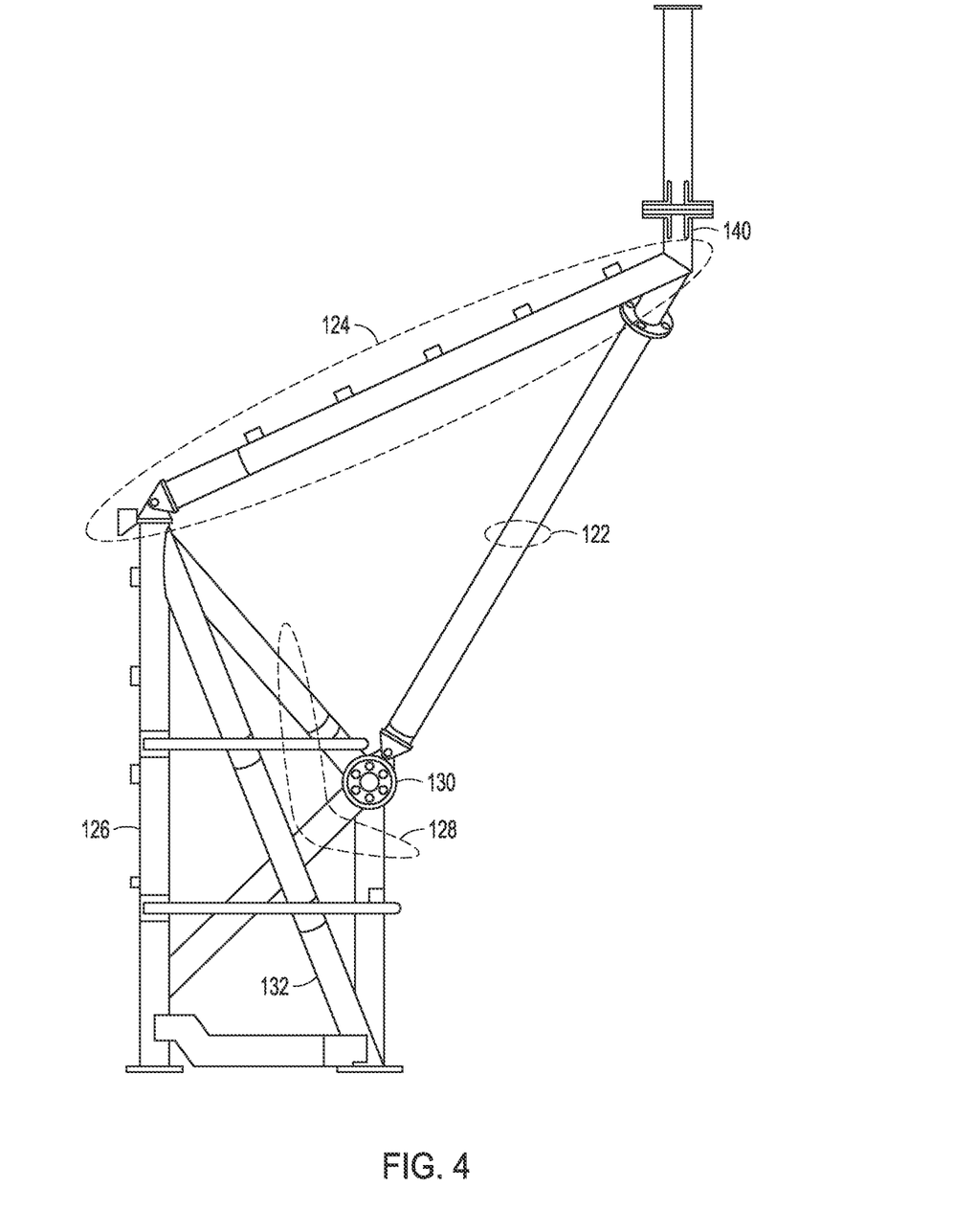
FIG. 4 is a side view thereof.

As shown in FIG. 2, the pair of diagonally braced columns 126 may provide a main supporting structure for the antenna mast structure 114. The diagonally braced columns 126 may each include a column 126 and a brace 132. The column 126 may be a generally vertically arranged column 126 defining an upright axis. The column 126 may be supported at a first end by the access platform 110 or a frame portion 102 within the access platform 110. A base plate may be provided at the column support point and the column 126 may be bolted, welded, or otherwise secured to the haul truck 100 at this location. The column may extend upward to a second end arranged at about ⅔ of the height of the antenna mast structure 114 (e.g., the height without the antennas). The brace 132 may extend diagonally relative to a vertical or the upright direction. In particular, the brace 132 may be arranged to a forward side of the column 126 relative to the truck 10. The brace 132 may also be supported at a first end by the access platform 110 or a frame portion 102 within the access platform 110. A base plate may be provided at the brace support point and the brace 132 may be bolted, welded, or otherwise secured to the haul truck 100 at this location. The brace 132 may extend diagonally from the support point upward and laterally to the top end of the column 126 to brace the column 126 and provide lateral stability for the column 126 about a horizontal and generally laterally extending axis. As shown in FIGS. 2 and 3, the base of the brace 126 on each side of the antenna mast structure 114 may be placed inboard of the column base and relative to a horizontal axis extending longitudinally along the haul truck 100. That is, each diagonally braced column set may be angled inward relative to a forward direction of the truck 100.

The pair of lower trusses 128 may extend from the diagonally braced columns 126 to a raised and frontal support point 130. As shown, the pair of lower trusses 128 might not be symmetrical about the centerline of the antenna mast structure 114. This may be for purposes of accommodating equipment or other elements on the access platform 110. In other embodiments, symmetrical lower trusses 128 may be provided. As shown in FIGS. 2 and 3, a right-side lower truss (i.e., right side of the haul truck/left side of FIG. 3) may include a 3-member truss structure. For example, truss members may include one extending from the base of the diagonal brace 132, one extending from the base of the column 126, and one extending from the top of the column 126. All three truss members may extend to the raised and frontal support point 130. A left-side lower truss (i.e., left side of the haul truck/right side of FIG. 3) may include a 2-member truss structure. For example, truss members may include one extending from the base of the diagonal brace 132 and one extending from the top of the column 126. Both truss members may extend to the raised and frontal support point 130. It is to be appreciated that based on platform arrangements and designs, alternative lower truss arrangements may be provided. For example, the three-member truss and two-member truss may be swapped from side to side, or three-member or two-member trusses may be provided on both sides. Still further, the truss member extending from the bottom of the brace 132 may be replaced with a truss member extending from the support platform 110 up to the raised and frontal support point 130. This truss member may be generally centered on the support structure 114 and aligned with or parallel to a longitudinal centerline of the truck 100, for example. Still further, while the raised and frontal support point 130 is shown as centered on the support structure 114, this support point may be offset to the side of the midline of the support structure 114.

The system or assembly of struts 134 may extend from the raised and frontal support point 130 upward to the top frame 124. The strut system may include a plurality of struts 134 secured to and emanating or radiating from the raised and frontal support point 130. For example, as shown, two, three, or more struts 134 may extend upward and diagonally forward to an outer edge of the top frame 124. The centrally located strut 134 may be aligned with a center of the haul truck 100 and/or the antenna mast structure 114 and might not lean diagonally side to side. However, the outboard struts 134 may lean diagonally outward to reach the outer edges of the top frame 124 and provide support at the outermost front corners of the top frame 124, for example.

Figure 5A:
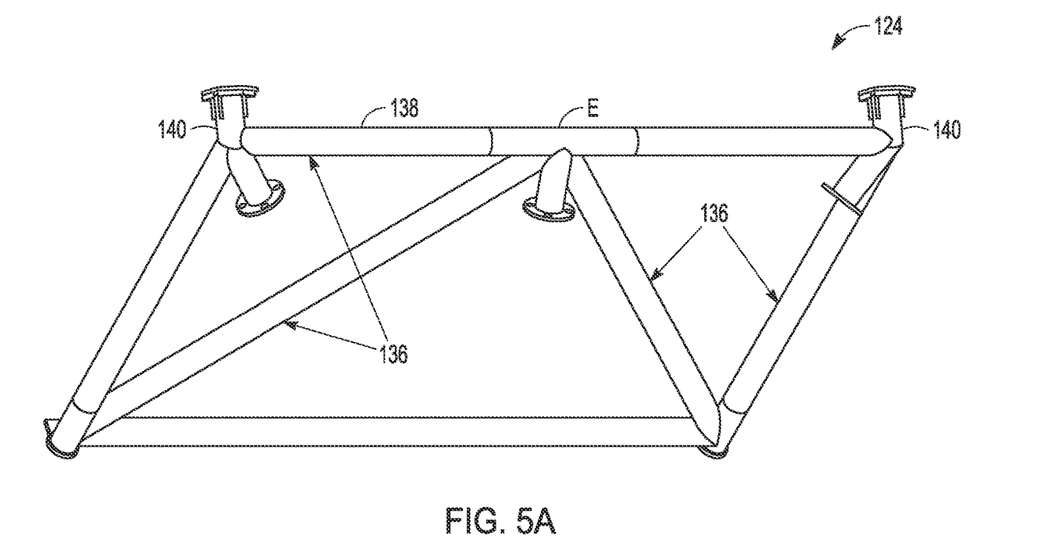
FIG. 5A is an isolated view of a top frame of the antenna mast structure of FIG. 2, according to one or more embodiments.
Figure 5B:
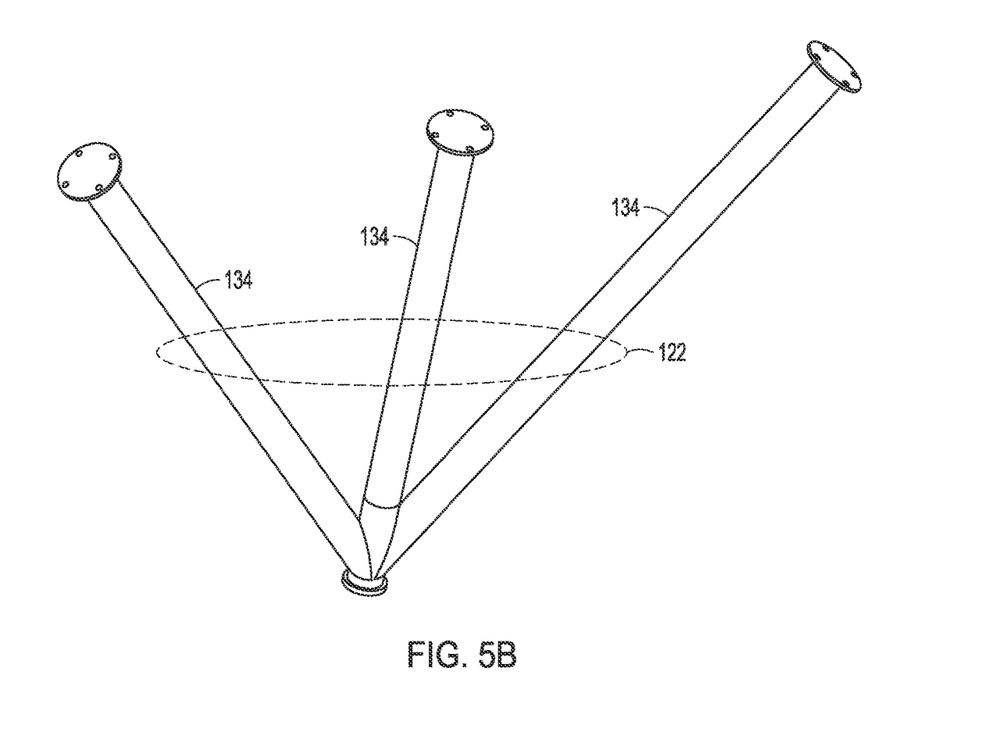
FIG. 5B is an isolated view of a propping element of the antenna mast structure of FIG. 2, according to one or more embodiments.

In one particular embodiment, the system or assembly of struts 134 may form a propping element with an ear adapted for securing to a raised frontal support point of a truss system. The ear may have a framing plate arranged orthogonally on a back side thereof. A central strut member may extend from the ear via the framing plate upward and to a central top frame support point. The central strut member may include a plate flange arranged on an end thereof and the plate flange may be substantially orthogonal to a longitudinal axis of the central strut member. The propping element may also include a pair of radiating strut members where one strut member is arranged on each side of the central strut member. The pair of strut members may extend from the ear via the framing plate upward and laterally outward to respective outer top frame support points. Each radiating strut may have a plate flange arranged on an end thereof and the plate flange may be substantially orthogonal to a longitudinal axis of the respective radiating strut member.

The top frame 124 may tie all of the upper most members of the antenna mast together 114. That is, for example, the top frame 124 may tie the tops of the columns 126 and the top ends of the struts 134 together. In one or more embodiments, the top frame may include a substantially rectangular frame when viewed from above and having a front frame member, a back frame member, and two side frame members. The frame 124 may be canted slightly upward from back to front to extend diagonally upward from the tops of the columns 126 to the tops of the struts 134. The frame 124 may include one or more bracing members in the plane of the top frame. In one or more embodiments, as shown best in FIG. 5A, a K-brace 136 may be provided. For example, as shown, diagonal K-brace members may extend from the corners of the frame 124 at the tops of the columns 126 forward and to a center of a front member 138 of the top frame 124 so as to be secured to the front member 138 at a location the same as the center strut 134. In other embodiments, a single cross brace may be provided. Moreover, where the center strut 134 is not centered on the support structure 114, the K-brace may extend to the point where the center strut 134 is connected to the front member 138 of the top frame so as to counteract the forces exerted on the front member 138 by the strut 134. The top frame may include downwardly and rearwardly extending stubs configured for aligning with and securing to the struts 134. Two stubs may be arranged on the outside front corners of the top frame and another stub may be arranged at the center of the front frame member. The downward and rearwardly extending stubs may include plate flanges arranged on ends of the stubs and the plate flanges may be substantially orthogonal to a longitudinal axis of the respective stubs. The plate flanges may be adapted for securing to the plate flanges of respective struts 134.

The top frame 124 may also include antenna platforms 140. The antenna platforms 140 may be adapted for attachment of antennas and, as such, may provide a relatively or substantially flat surface, clear of the support structure 114 and truck 100 for attachment of the antennas. The antenna platforms 140 may include vertically extending stub columns, for example. The stub columns may extend upward from the corners of the frame 124 and may include a top plate. The stub columns may be welded to the top frame 124 and to the top plate and the top plate may include bolt holes for securing a flange of an antenna to the top plate, for example. Still other attachment approaches may be provided. For example, a vertically extending pin or tube for sleevably engaging a bottom of an antenna may be provided. Still other approaches to antenna attachment may be provided.

Figure 5C:
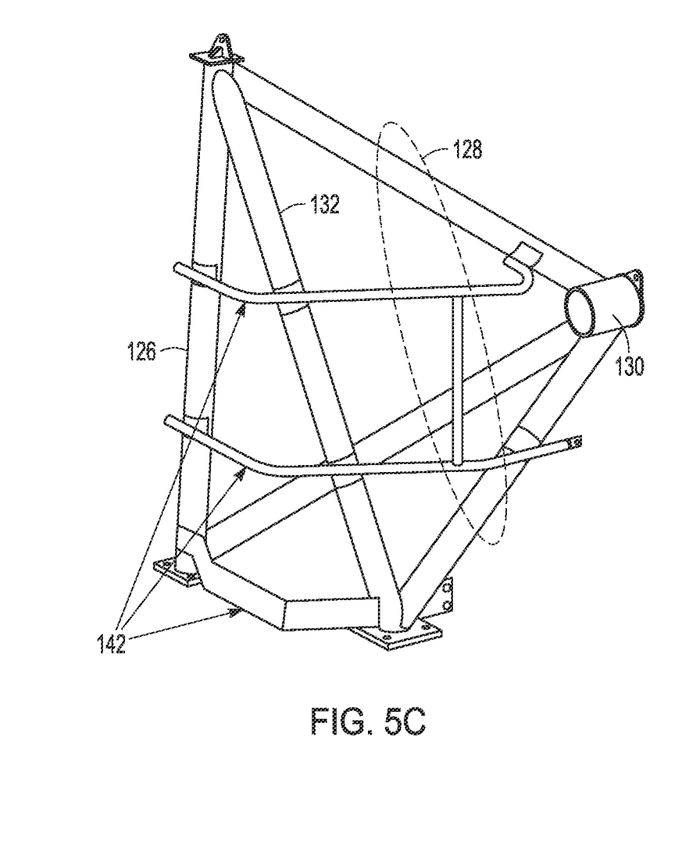
FIG. 5C is an isolated view of a right-side lower truss of the antenna mast structure of FIG. 2, according to one or more embodiments.
Figure 5D:
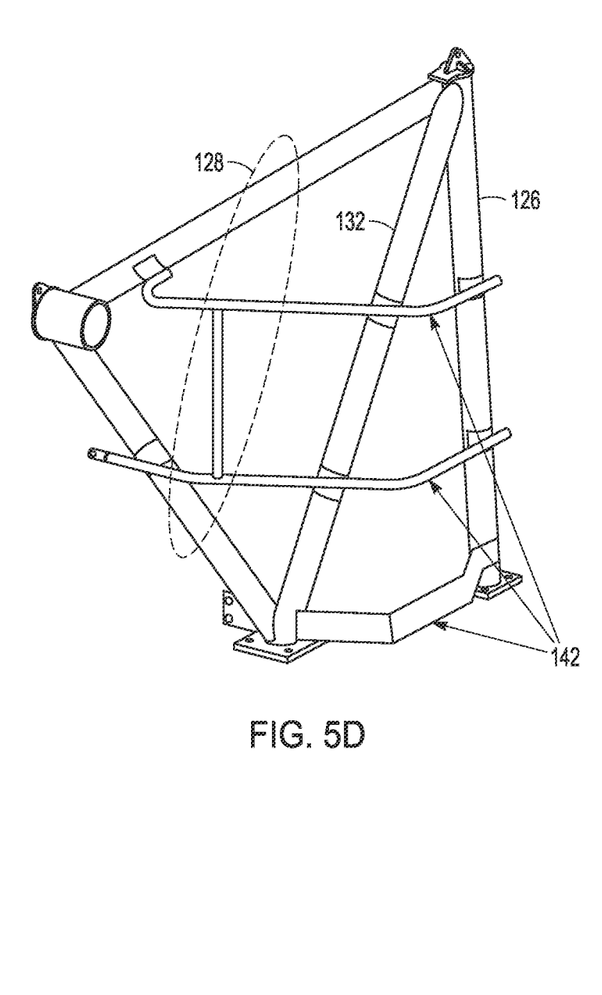
FIG. 5D is an isolated view of a left-side lower truss of the antenna mast structure of FIG. 2, according to one or more embodiments.

As shown in FIGS. 5C and 5D, the antenna mast structure 114 may also include railings 142. For example, a tube, pipe, plate, or other elongate member may be supported on the braced columns 126 and the lower truss members 128 and may wind along a peripheral outer edge of the antenna mast structure 114 to provide fall protection to personnel on the access platform 110 behind the antenna mast structure 114. As shown, the railing 142 may include a toe kick plate, a mid-rail, and a top rail, for example.

Figure 6A:
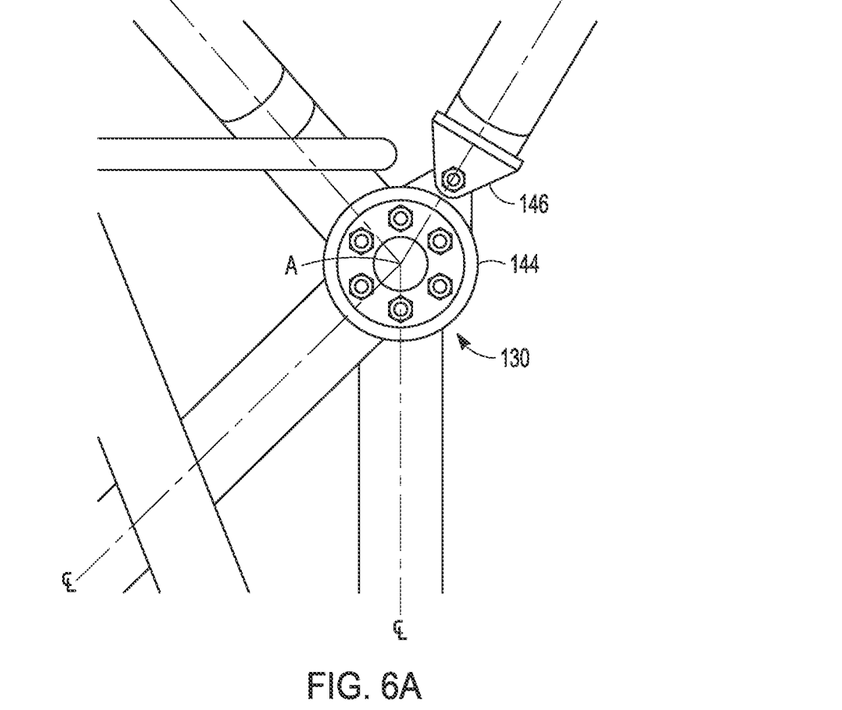
FIG. 6A is a close-up side view of a raised frontal support point of the antenna mast structure, according to one or more embodiments.
Figure 6B:
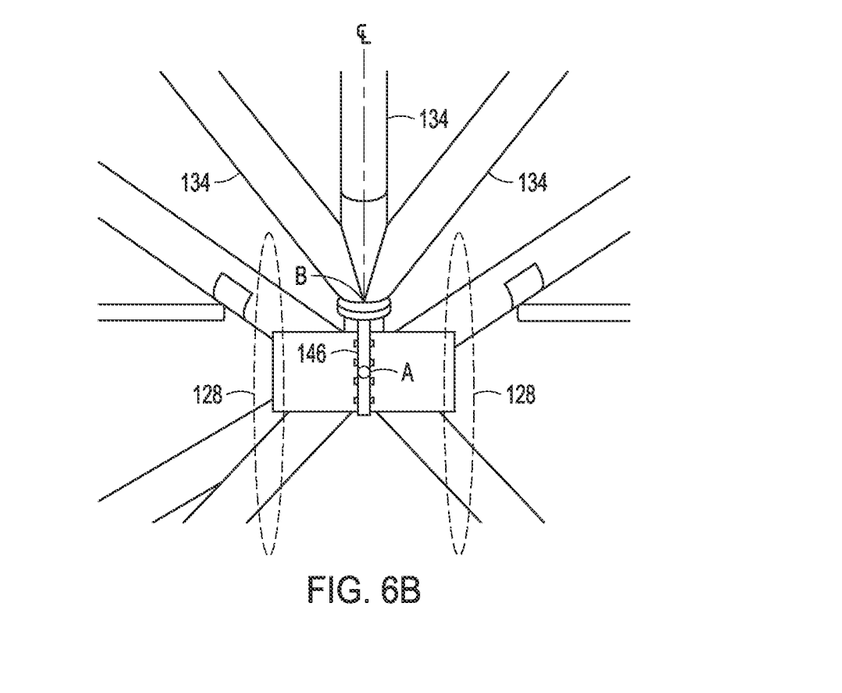
FIG. 6B is a close-up front view of a raised frontal support point of the antenna mast structure, according to one or more embodiments.

The antenna mast structure 114 may include several connections or joints as shown. The joints of the antenna mast structure may have one or more things in common. For example, where possible, the several members being joined at a particular joint may be arranged such that the several longitudinal centerlines of each member all pass through a common point. For example, and as shown in FIGS. 6A and 6B, all of the members of the lower truss members have longitudinal centerlines that pass through point A. In order to provide suitable weld area for the several members adjoining at point A, a central support can 144 may be provided. As shown, the central support can 144 may have two halves that each receive members from the lower trusses 128 from their respective sides. The two halves of the central can 144 may then be bolted to one another via end plates as shown in FIG. 6A.

Figure 7:
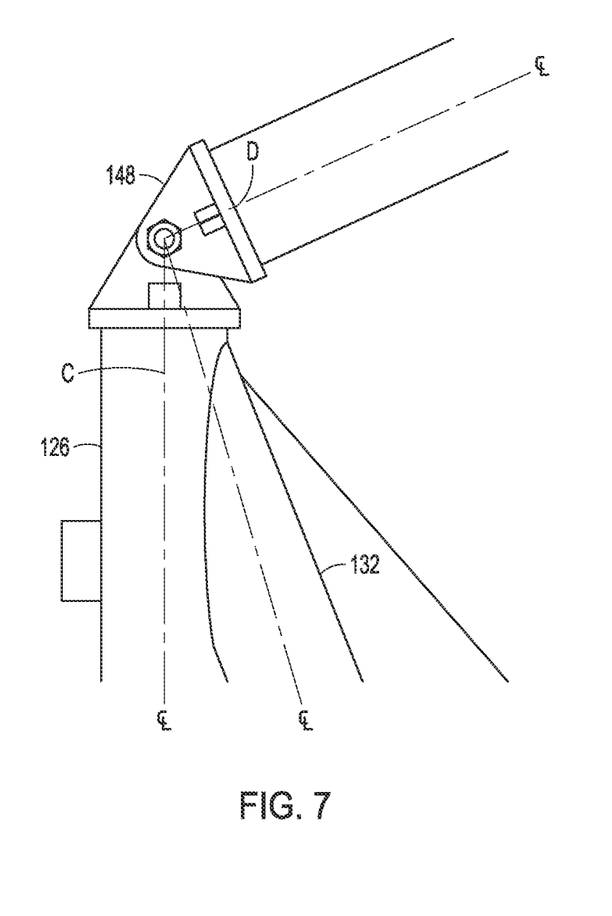
FIG. 7 is a close-up side view of a joint between atop frame and a braced column of the antenna mast structure, according to one or more embodiments.

As shown in FIG. 6B, the longitudinal centerline of the center strut member 134 may also pass through point A. However, due to the pin connected joint of the strut members 134 to the raised frontal support point 130, the diagonally extending strut members 134 have longitudinal centerlines that intersect with the longitudinal centerline of the central strut 134 member at point B, which may be at or near the attachment of the pin fitting at the intersection of the several strut members 134. Similarly, as shown in FIG. 7, the column 126 and brace 132 may have longitudinal centerlines that intersect at a point C, which may be at or near the attachment of the hinge bracket to the top of the column 126. As also shown in FIG. 7, the longitudinal centerlines of the top frame members (e.g., sides, back, and K-brace) may intersect at a point D, which may be at or near the attachment of the ear plate of the top frame 124 that allows for a pivoting connection between the top frame 124 and the braced column 1262. Still further, as shown in FIG. 5A, the longitudinal centerlines of the two diagonal K-brace members, the front member 138 of the top frame 124, and the center strut 134 may all intersect at point E. These common intersection points of the longitudinal axes of the members may help to avoid or reduce localized bending and shear force from developing in and around the connections, which can generate unanticipated or high forces and can lead to fatigue loading and failure of the structure.

Figure 8:
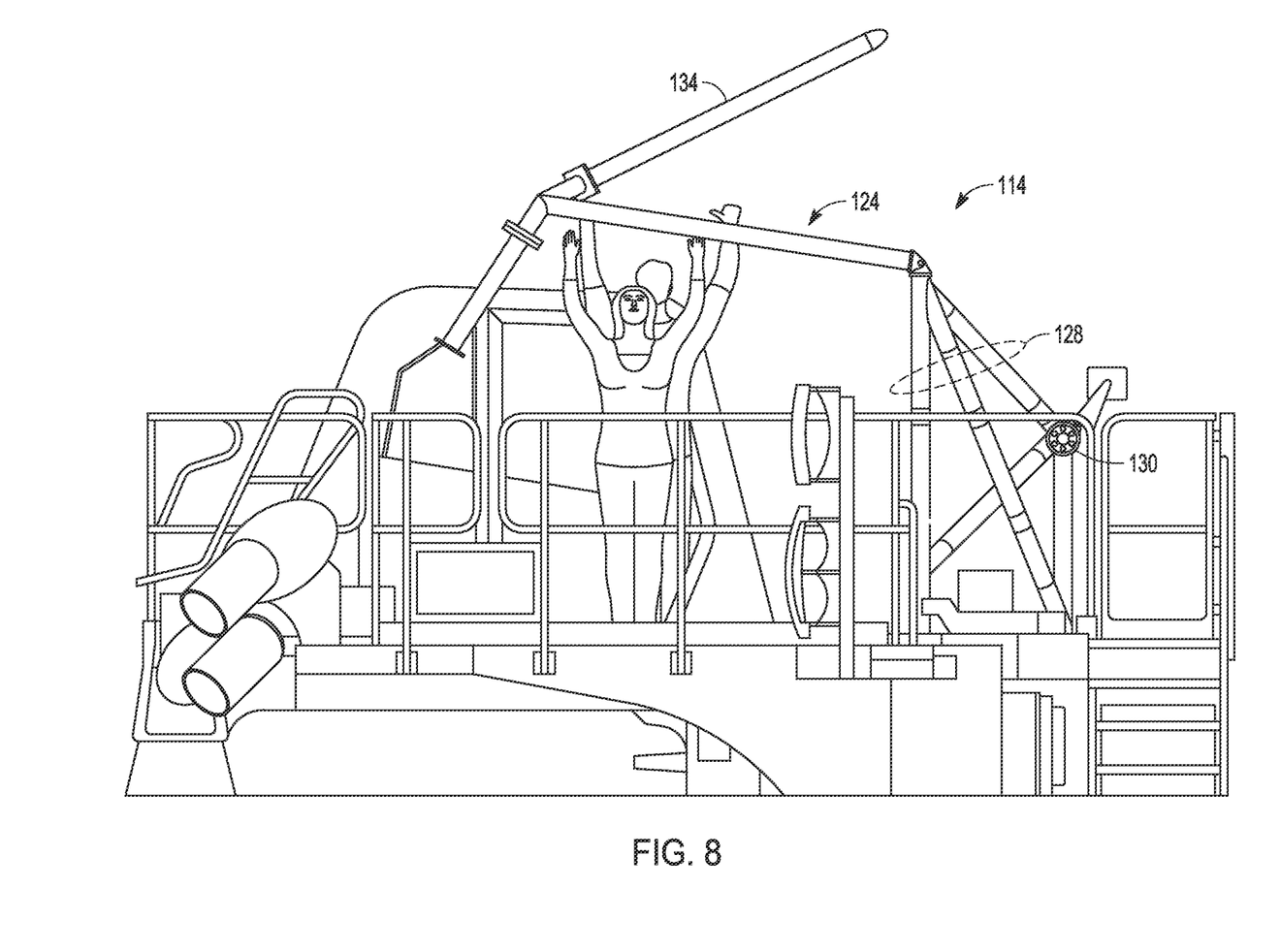
FIG. 8 is a side view of an antenna mast structure being serviced, according to one or more embodiments.

In one or more embodiments, the antenna mast structure 114 may include particular features allowing for serviceability of the antennas and for serviceability of the antenna mast structure itself. As shown in FIGS. 6A and 6B, the strut members may be secured to a connection ear, tab, or multiple ears or tabs 146 for pinned, bolted, or other detachable connection to the raised frontal support point 130. Moreover, as shown in FIG. 7, the top frame 124 may be secured to the braced columns 126 with a connection ear, tab, or multiple ears or tabs 148 for pinned and pivoting connection to the braced columns 126. As shown in FIG. 8, this may allow for the struts 134 to be unpinned from the lower trusses 128 and the top frame 124 and strut assembly may be pivoted over the top of the braced columns 126, which may invert the top frame 124 and allow for access to the antennas on the frame 124 from the access platform 110.

As mentioned, and in addition to servicing the antennas, the several parts of the antenna mast structure 114 may be easily disassembled allowing for particular aspects of the structure to be replaced on site. For example, and as shown in the individual views of FIGS. 5A, 5B, 5C, and 5D, each of the braced columns 126 and lower trusses 128 may be a welded structure or a composite/metal assembly with welded connections. Likewise, the strut assembly and the top frame 124 may each be a welded structure or a composite/metal assembly with welded connections. As such, any one or multiples of these aspects of the antenna mast structure 114 may be removed and replaced with a new one by unbolting the respective portion from the structure and inserting a replacement one. Still further, the removed portions of the structure may be re-manufacturable. For example, a customer/dealer may remove a broken portion of the structure and send it back to the manufacturer to be repaired.

Figure 9:
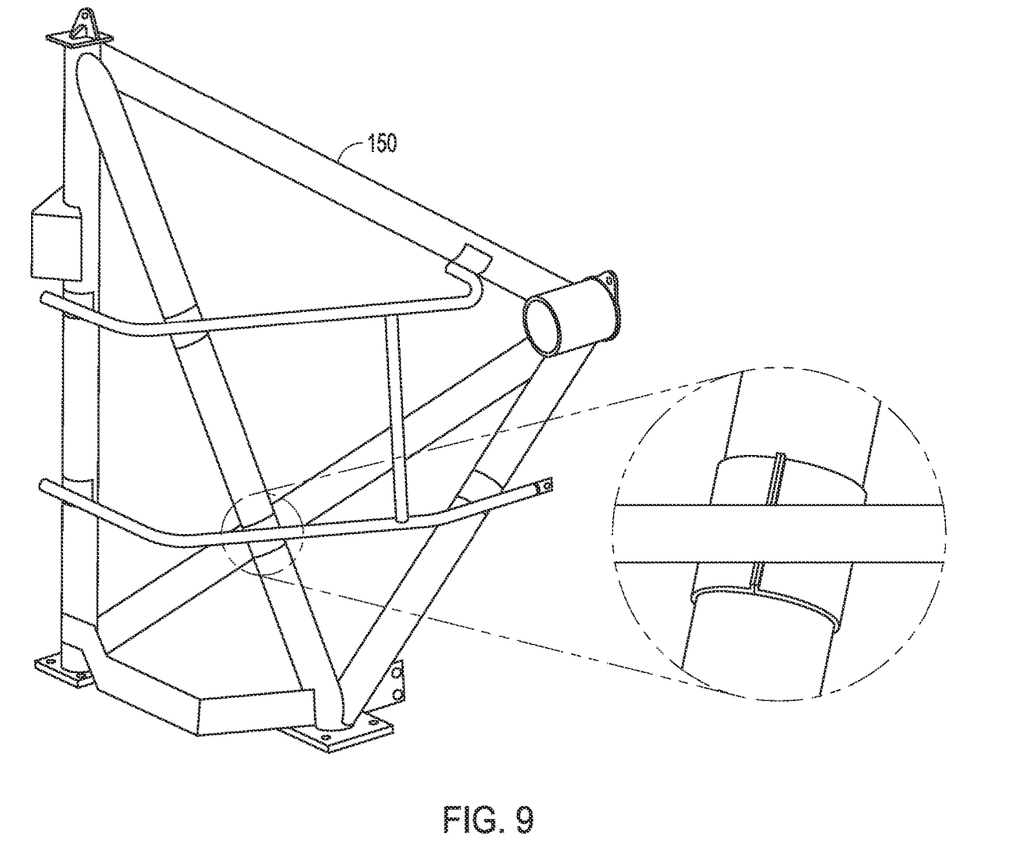
FIG. 9 is a side view of a buttressed frame comprising composite members and metal connection elements and including a close-up view of a railing connection thereof, according to one or more embodiments.

As mentioned with respect to serviceability, the antenna mast structure 114 may be a fully metal structure with selected welded and bolted connections as described. For example, the structure may be steel, aluminum, stainless steel, or another metal alloy, for example. In one or more embodiments, the antenna mast structure 114 may be a composite material, such as carbon fiber, fiberglass, aramid fiber, boron fiber, polyethylene fiber, zylon fiber, or other composite materials. In this case, the members may be made from the composite material and the connections may be made from a metal material such as steel, aluminum, stainless steel or another alloy. Replacement of the members with a composite material may provide for a lighter structure overall and the metal connections may provide high strength at the joints as well as providing for welding as a connection option. In still one or more other embodiments, the connections may be made from a composite material like the members. In this case, the connections may be bonded or adhered to the members like the metal connections or the connections may be manufactured with the members in a same layup, for example. In one or more embodiments, as shown in FIG. 9 the connections may include sleeves 150 (e.g., metal or composite sleeves) that extend from the joints just as the metal members shown in FIGS. 2-7, but the sleeves 150 may stop a short distance from the connection and a composite tube member may be inserted into the sleeve 150 and adhered within the sleeve. In one or more embodiments, the composite or carbon fiber members may be adhered within the sleeves 150 with an adhesive such as epoxy, cyanoacrylate, urethane, acrylic, or another adhesive, for example. As such, a composite member may be much the same as a corresponding metal member, but may have a main body length made from composite materials and a metal or composite sleeve over its ends at its respective connection points.

INDUSTRIAL APPLICABILITY

In operation and use, the antenna mast structure may be placed on an access platform of a haul truck, for example. One or more communication and/or GNSS antennas may be placed on and secured to the support structure. The support structure may provide a support location that allows the antennas to extend up above the truck bed and a protective platform of the truck bed such that 360 degrees of vision are available for the antenna. In one or more embodiments, the haul truck may be an autonomously controlled haul truck and one or more controllers of the haul truck may rely on the antennas on the haul truck to receive and assess position information of the haul truck. The controllers may control the haul truck using a transceiver in communication with one or more antennas on the haul truck that are in signal communication with a transceiver on the haul truck. While antennas, in particular, have been described as being supported by the antenna mast structure, still other tools and/or features of the haul truck may be supported by the support structure.

The antenna mast structure may be particularly suited for use on the haul truck because of its durable fatigue resistant design. That is, the truss connections may cause the loading of the members to be generally and substantially tensile and compressive loads and bending loads in the members may generally be avoided. In particular, local bending at or near the connections may also be minimized, reduced, or avoided making the structure suitable for long term use and resistant to repetitive vibratory loading. In one or more embodiments, the resonant frequency of the structure may have a minimum frequency of approximately 15 Hz, or approximately 20 Hz, or approximately 25 Hz.

Figure 10:
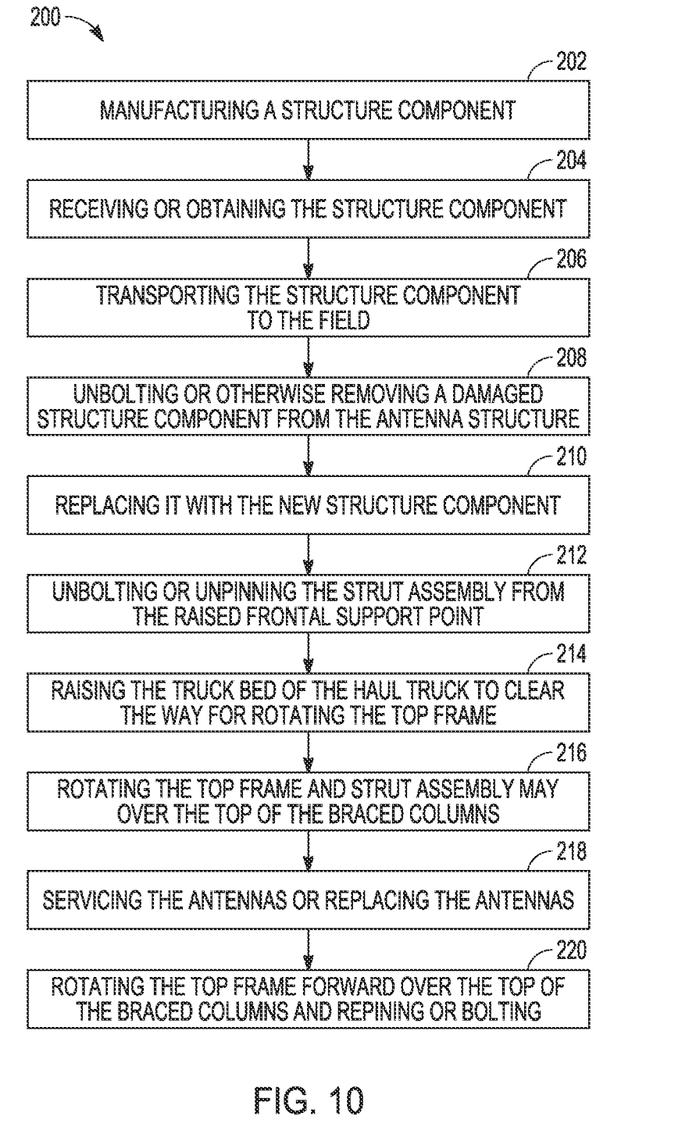
FIG. 10 is a diagram depicting a method of servicing the antenna mast structure, according to one or more embodiments.

In one or more embodiments, a method 200 of servicing the antenna structure may include manufacturing a structure component 202. For example, a left or right braced column, a left or right lower truss, or an entire buttressed frame may be manufactured offsite. Still further, a strut assembly, or a top frame, may be assembled offsite. In one or more embodiments, a single member may be manufactured. In another example, a new antenna may be manufactured. The method may also include receiving or obtaining a structure component 204. For example, service personnel may receive or obtain a structure component from a manufacturer, an operator, or other provider of the structure component. The method may also include transporting the structure component to the field where the haul truck is such that an onsite repair may be performed 206. In one or more embodiments, the method may also include unbolting or otherwise removing a damaged structure component from the antenna structure 208 and replacing it with the new structure component 210. Where the part to be repaired or replaced is an antenna, the strut assembly may be unbolted or unpinned from the raised frontal support point 212 and the top frame and strut assembly may rotated or flipped over the top of the braced columns to allow for access to the antennas 216. In one or more embodiments, the truck bed of the haul truck may be raised to clear the way for flipping the top frame of the antenna mast structure 214. Once the top frame is flipped, the antennas may be serviced or replaced by disconnecting them from the antenna mast structure and replacing them with a new one 218. Upon completion of the service, the top frame may be flipped forward again and the strut assembly may be pinned to the raised frontal support point 220.

The above detailed description is intended to be illustrative, and not restrictive. The scope of the disclosure should, therefore, be determined with references to the appended claims, along with the full scope of equivalents to which such claims are entitled.

What is claimed is:

1. An antenna mast structure for a haul truck, comprising:
a buttressed frame having a support column and a raised frontal support point;
a propping element extending from the raised frontal support point; and
a top frame pivotally secured to the support column and supported at a front side by the propping element.

2. The antenna mast structure of claim 1, wherein the buttressed frame comprises a diagonally braced column and a lower truss.

3. The antenna mast structure of claim 2, wherein the propping element comprises a strut assembly.

4. The antenna mast structure of claim 3, wherein the strut assembly is pinned to the raised frontal support point.

5. The antenna mast structure of claim 4, wherein the top frame is pivotable about the support column together with the strut assembly by unpinning the strut assembly from the raised frontal support point.

6. The antenna mast structure of claim 1, wherein the buttressed frame, the propping element, and the top frame comprise composite members and at least one of metal sleeve ends and composite sleeve ends arranged thereon.

7. The antenna mast structure of claim 6, wherein the metal sleeve ends or composite sleeve ends are secured to the composite members with an adhesive.

8. The antenna mast structure of claim 7, wherein the composite members are carbon fiber members and the adhesive is an epoxy.

9. The antenna mast structure of claim 1, wherein a plurality of member connections in the buttressed frame include longitudinal centerlines of each member at each connection passing through a common point.

10. The antenna mast structure of claim 1, wherein a plurality of member connections in the top frame include longitudinal centerlines of each member at each connection passing through a common point.

11. The antenna mast structure of claim 3, wherein the top frame comprises a generally rectangular frame secured to the top of the braced column and extending forward and upward from the braced column.

12. The antenna mast structure of claim 11, wherein the strut assembly comprises a plurality of strut members emanating forwardly and upwardly from the raised frontal support point to respective support points on the top frame.

13. The antenna mast structure of claim 1, further comprising a GNSS antenna arranged on the antenna mast structure.

14. The antenna mast structure of claim 13, wherein the GNSS antenna extends upward above a bed of the haul truck to allow for 360 degrees of vision of the antenna.

15. The antenna mast structure of claim 1, wherein the resonant frequency of the antenna mast structure is equal to or greater than 20 Hz.

16. A haul truck, comprising:
a frame;
a traction system for moving the frame;
an access platform;
a truck bed having a protective platform extending over the access platform to a front edge; and
an antenna mast structure arranged on the access platform, the antenna mast structure, comprising:
a buttressed frame having a support column and a raised frontal support point;
a propping element extending from the raised frontal support point; and
a top frame pivotally secured to the support column and supported at a front side by the propping element such that a front of the frame is arranged just below and forward of the front edge of the protective platform.

17. The haul truck of claim 16, wherein the buttressed frame comprises a diagonally braced column and a lower truss.

18. The haul truck of claim 17, wherein the propping element comprises a strut assembly.

19. The haul truck of claim 18, wherein the strut assembly is pinned to the raised frontal support point.

20. The haul truck of claim 19, wherein the top frame is pivotable about the support column together with the strut assembly by unpinning the strut assembly from the raised frontal support point.

21. A buttressed frame, comprising:
a vertically arranged column defining an upright axis and configured for attachment to a support platform at a support point;
a diagonal brace configured for attachment to a support platform at a brace point arranged generally forward of the support point, the diagonal brace extending upward and laterally rearward from the brace point to a top end of the column; and a truss comprising a first truss member extending upwardly, forwardly, and laterally from the diagonal brace near the brace point to a raised frontal support point and a second truss member extending downwardly, forwardly, and laterally from the top end of the column to the raised frontal support point.

22. The buttressed frame of claim 21, further comprising a half of a central support can at the raised frontal support point, the half of the central support can being adapted for securing to another half of the central support can and having the first and second truss members secured thereto.

23. The buttressed frame of claim 22, further comprising an ear or tab for securing a propping element.

24. A propping element, comprising:

an ear adapted for securing to a raised frontal support point of a truss system;

a central strut member extending from the ear upward and to a central top frame support point and having a plate flange arranged on an end thereof, the plate flange being substantially orthogonal to a longitudinal axis of the central strut member.

a pair of radiating strut members, one on each side of the central strut member, extending from the ear upward and laterally outward to respective outer top frame support points, each radiating strut having a plate flange arranged on an end thereof, the plate flange being substantially orthogonal to a longitudinal axis of the respective radiating strut member.

25. A top frame, comprising:

a back frame member, a front frame member spaced from the back frame member, and a pair of side frame members extending between the ends of the back frame member and the front frame member to form a rectangular frame;

a K-brace arranged within the frame and comprising diagonal K-brace members that extend from respective intersections of the side frame members and the back fame member to a center of the front frame member;

a plurality of downwardly and rearwardly extending stubs extending from the front frame member and adapted to align with and secure to the a plurality of supporting strut members; and an antenna platform comprising a stub column extending upward from the front frame member and including a top plate for securing an antenna thereto.

* * * * *